(12) United States Patent
Kraft et al.

(10) Patent No.: US 7,177,948 B1
(45) Date of Patent: Feb. 13, 2007

(54) METHOD AND APPARATUS FOR ENHANCING ONLINE SEARCHING

(75) Inventors: Reiner Kraft, Gilroy, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,150

(22) Filed: Nov. 18, 1999

(51) Int. Cl.
*G06F 15/16* (2006.01)

(52) U.S. Cl. .......................... 709/246; 707/3; 715/800; 715/801

(58) Field of Classification Search ............... 345/704, 345/738, 968, 739, 709, 918; 707/5, 3; 709/203, 709/223, 224, 205, 273, 217–219, 246; 705/27; 715/700, 800, 801
See application file for complete search history.

(56) References Cited

U.S. PATENT DOCUMENTS

| | | | | |
|---|---|---|---|---|
| 5,708,825 A * | 1/1998 | Sotomayor | ............... | 715/501.1 |
| 5,764,235 A * | 6/1998 | Hunt et al. | ................. | 345/428 |
| 5,842,206 A * | 11/1998 | Sotomayor | ..................... | 707/2 |
| 5,847,708 A * | 12/1998 | Wolff | ......................... | 715/764 |
| 5,870,549 A * | 2/1999 | Bobo, II | ..................... | 709/206 |
| 5,870,770 A * | 2/1999 | Wolfe | ........................ | 715/805 |
| 5,877,766 A * | 3/1999 | Bates et al. | ................. | 715/854 |
| 5,884,056 A * | 3/1999 | Steele | ......................... | 715/738 |
| 5,933,140 A * | 8/1999 | Strahorn et al. | ............ | 345/709 |
| 5,963,969 A * | 10/1999 | Tidwell | ...................... | 707/500 |
| 5,982,369 A * | 11/1999 | Sciammarella et al. | ..... | 345/835 |
| 5,986,654 A * | 11/1999 | Alexander et al. | .......... | 345/744 |
| 6,006,265 A * | 12/1999 | Rangan et al. | .............. | 709/226 |
| 6,070,176 A * | 5/2000 | Downs et al. | .............. | 345/848 |
| 6,226,655 B1 * | 5/2001 | Borman et al. | .......... | 715/501.1 |
| 6,269,362 B1 * | 7/2001 | Broder et al. | .................. | 707/1 |
| 6,272,484 B1 * | 8/2001 | Martin et al. | .................. | 707/1 |
| 6,301,586 B1 * | 10/2001 | Yang et al. | ............. | 707/104.1 |
| 6,307,573 B1 * | 10/2001 | Barros | ........................ | 345/440 |
| 6,335,746 B1 * | 1/2002 | Enokida et al. | ............. | 345/839 |
| 6,405,192 B1 * | 6/2002 | Brown et al. | .................. | 707/3 |
| 6,567,177 B2 * | 5/2003 | Matsuyama | ................ | 358/1.14 |

OTHER PUBLICATIONS

Czerwinski et al., The Contributions of Thumbnail image, Mouse-over Text and Spatial Location Memory to Web Page Retrieval in 3D, May 1999, Interact '99, pp. 163-170.*
Microsoft Press Computer Dictionary, Third Edition, 1997, p. 156.*
http://www.camcity.com (Apr. 7, 1999).*
Dragutsky, "Image search Engine Reviews: Scour.Net, GIF Wizard and Image Surfer". Search and Metasearch Engines, Oct. 2, 1998.*
Dragutsky, "Image Search Engine Reviews: Scour.Net, GIF Wizard and Image Surfer", *Search and Metasearch Engines*, Oct. 2, 1998.

* cited by examiner

*Primary Examiner*—Saleh Najar
*Assistant Examiner*—Dhairya A. Patel
(74) *Attorney, Agent, or Firm*—Edmund Mizumoto, Esq.; McGinn IP Law Group, PLLC

(57) ABSTRACT

A method and apparatus are provided for processing search results obtained in response to a user query. This may include examining document pointers returned by a search engine to identify a source from which the documents are available and generating at least two visual abstracts of each of the documents. Each of the visual abstracts may be of a different size. The method and system may also include formatting a stream of data such that when the data is displayed, a smaller one of the visual abstracts appears adjacent to a corresponding search result.

24 Claims, 8 Drawing Sheets

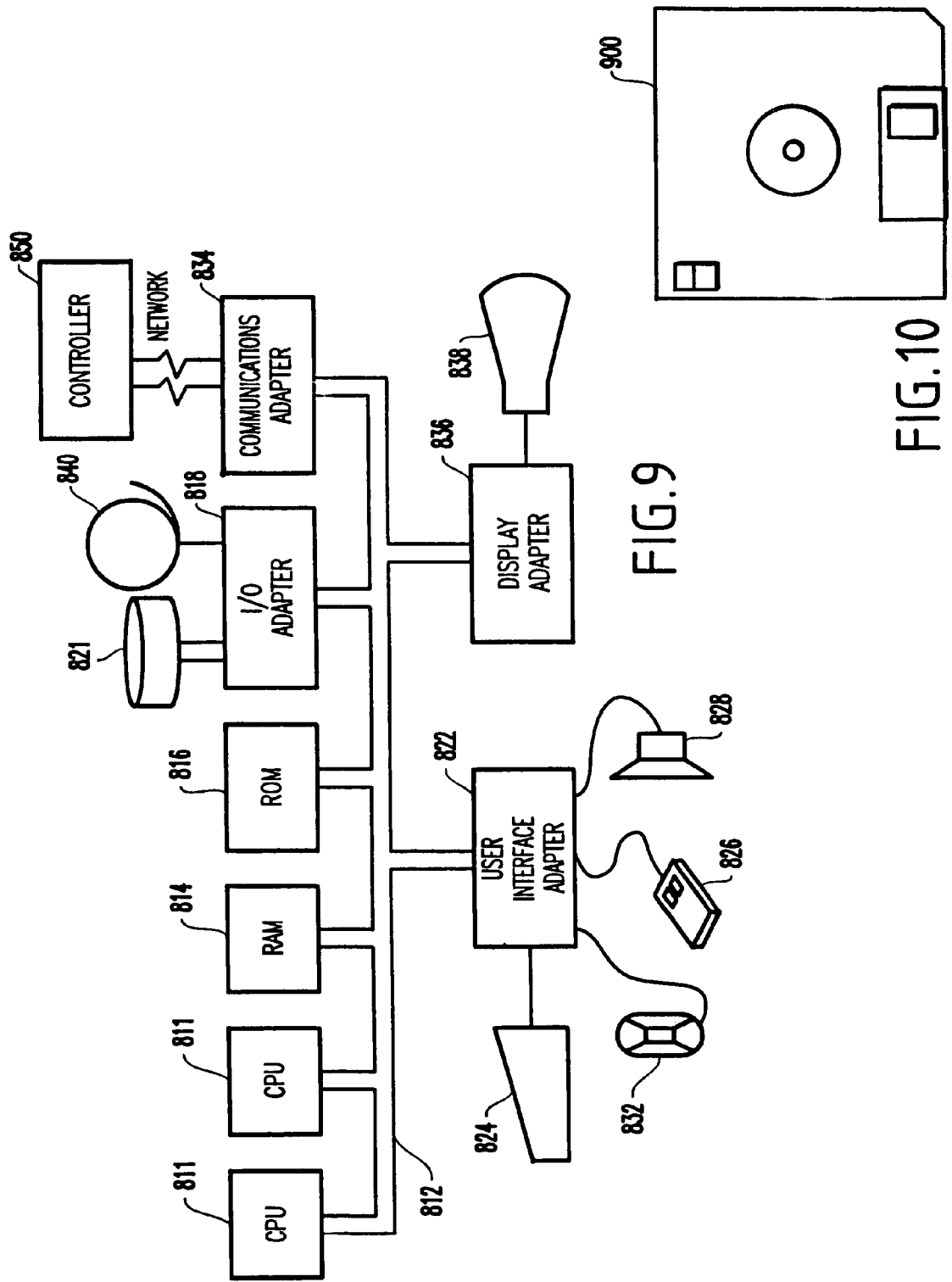

METHOD AND APPARATUS FOR ENHANCING ONLINE SEARCHING

BACKGROUND OF THE INVENTION

1. Field of the Invention

The present invention generally relates to online search technologies and document summarizations. More specifically, the present invention relates to a method and apparatus for efficiently processing search results obtained in response to a user query.

2. Description of the Related Art

An important use of computers is the transfer of information over a network. Currently, the largest computer network in existence is the Internet, which, as is well known, is a worldwide interconnection of computer networks that communicate using a common protocol. Millions of computers, from low end personal computers to high end super computers, are connected to the Internet.

In the late 1980s, a new type of information system, known as the World Wide Web ("the Web") was introduced to the Internet. As is well known, the Web is a wide-area hypermedia information retrieval system aimed to give wide access to a large universe of documents.

The architecture of the Web follows a conventional client-server model. The terms "client" and "server" refer to a computer's general role as a requester of data (i.e, the client) or a provider of data (i.e., the server). In the Web environment, Web browsers are clients and Web documents reside on servers. Web clients and Web servers communicate using a protocol called "Hypertext Transfer Protocol" (HTTP). A browser opens a connection to a server and initiates a request for a document. The server delivers the requested document, typically in the form of a text document coded in a standard Hypertext Markup Language (HTML) format.

Portions of documents displayed on the Web may contain hypertext links. The hypertext links link graphics or text on one document with another document on the Web. Each hypertext link is associated with a Universal Resource Locator (URL). A URL specifies a server and a particular document on that server. When a user selects a hypertext link, using, for instance, a cursor, the browser connects to the server and retrieves the document(s) specified by the URL(s).

Some servers provide a means for searching a collection of documents. Upon initial request, the server supplies a form to the browser. The user, using the browser, enters data such as keywords on this form as part of a search query and then opens a new connection to the server and submits this data to the server. The server responds to this request with a new document listing, some or all of the documents matching those key words or other data requested by the browser. Each listed document normally includes a hypertext link to the actual document so that the user may easily retrieve that document.

Today, finding information as easily and quickly as possible has become a crucial problem. The World Wide Web contains millions of documents spread over hundreds of thousands of computers throughout the world. Although hypertext links tie all these documents together, the distributed architecture of the Web produces an incoherent system that often makes it very difficult for users to locate documents of interest.

Search engines have become more and more important with the continuous growth of information in order to find and retrieve information from a large repository such as the Internet and databases. As is well known, current search technology is usually based on an electronic search form, where the user enters keywords to form a query. As discussed above, the query is submitted to the search engine, which in turn presents links to the matching resources in the repository, a document title, or possible summary information in the form of a short abstract of the original document. This abstract may be generated automatically and may contain the essence of the document. The user must then determine the relevance or importance of a document by reviewing the title and/or the abstract of the document presented in the result page of the search.

The larger the result set, the longer it takes the user to review the document titles and abstracts of the search results. Research has shown that a typical user will only carefully review the first five to ten result summaries for a particular search. However, search results may contain several hundred or several thousands of hits. Techniques, such as Boolean query language, may be used to limit and narrow down the number of hits.

A result set of ten to twenty hits may still take considerable time and effort to review because of the time required for reading the title and abstract. To really ensure whether a document is an ideal match to the search query, a user still has to open (i.e., view) a document. This means, however, that by clicking on a hyperlink (URL) and accessing a document resource with a web browser, the document content must be downloaded from the server to the client before viewing. It may take a considerable amount of time to access the document which therefore slows down the whole process. After downloading a document from the server, the user may then determine that the downloaded document is not a good match for the original search query. The user may then continue to read through the rest of the original result page and skim other abstracts looking for a more promising document. As a result of this process, a user typically has to download several documents until there is a good match for the original search query.

Documents with large amounts of text data may be rendered and then resized in order to create a visual abstract (also known as a thumbnail). As is well known to one skilled in the art, rendering means to process a document for representation. For example, an HTML document includes data and format instructions (i.e., tags). The format instructions need to be rendered before it can be displayed in its intended way. Rendering is typically done with a web browser such as Netscape Navigator or MS Internet Explorer. The rendering engine of the web browser essentially processes format instructions and converts them into graphical elements, determines the layout and calculates the overall appearance of the document.

However, after rendering and resizing the original body of text of the abstracts may not be readable because the font is too small. Moreover, with today's standard screen resolution, it may not be possible to produce a readable font in this size. It would be helpful for the user to read the headings or title and be able to determine whether a document is desirable for further reading. However, resizing algorithms use proportional resizing. The body text, which cannot be displayed at this size, will be reduced to the same size as the heading. It would be helpful to resize the body text and use this additional space to enlarge the headings and titles so that the user can read them.

SUMMARY OF THE INVENTION

In view of the foregoing and other problems of the conventional methods, it is, therefore, an object of the present invention to provide a method and apparatus of efficiently processing search results obtained in response to a user query.

The method according to the present invention may include examining document pointers returned by a search engine to identify a source from which the documents are available, obtaining the documents from the source and generating at least two visual abstracts for a desired document. Each of the visual abstracts is of a different size. A stream of data may be formatted such that when the data is displayed, a smaller one of the visual abstracts appears adjacent to a corresponding search result. A larger visual abstract may be displayed on the display screen when a cursor is moved over the smaller one of the visual abstracts. The larger visual abstract may also be removed from the display screen when the cursor is moved away from the smaller visual abstract.

The method according to the present invention may also include processing search results obtained in response to a user query. Document pointers returned by a search engine may be examined to identify a source from which the documents are available. The documents may be obtained from the source. Visual abstracts may be generated for each of the documents. Each visual abstract may be formed by manipulating a corresponding source document so as to enhance the visibility of at least a first portion of the source document while degrading visibility of at least a second portion of the source document. A stream of data may be formatted such that when the data is displayed on a display screen, each visual abstract appears adjacent to a corresponding search result.

It is also an object of the present invention to provide a computer system for searching for a document. This system may include a client system and a server system. The client system may be capable of supplying a search request to the server system. The server system may provide abstracts of documents to the client system. Further, the client system may display the abstracts on a display screen. The abstracts may include a written abstract and a first visual abstract of the documents. The server system may create a second visual abstract of one of the documents. The second visual abstract may be larger than the first visual abstract and the client system may display the second visual abstract when requested by a user.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein:

FIG. 3 shows the result page after the cursor has been moved from the result page;

FIG. 5 shows a web page having a title and a body of text;

FIG. 6 shows a web page having an enhanced title;

FIG. 9 is a schematic block diagram of the structure of an exemplary information handling/computer system for use with the present invention; and FIG. 10 illustrates a medium for storing a program for implementing the method according to the present invention.

DETAILED DESCRIPTION OF PREFERRED EMBODIMENTS OF THE INVENTION

The present invention aims to enhance the user's ability to perform online searching. This may be accomplished by creating (and caching) a medium-sized thumbnail of a document so as to better view the document. This may also be accomplished by enhancing the title or heading of a document or this may also be accomplished by dynamically presenting a visual abstract of a document.

A system according to the present invention may enhance searching techniques by displaying a medium sized visual abstract (i.e., image thumbnail) on demand. This provides the user with a clue about how the document looks as well as provides a preview of the selected document's content. A preferred method provides a medium sized thumbnail (around 300×200 pixels) in order to get a fairly good impression of the actual document. With this medium sized document, the user can read headlines or topics and recognize images and fonts much better than prior art methods. By reviewing the medium sized thumbnail, the user can determine whether a document is a good match and therefore needs to be downloaded. Accordingly, there is no need to download the entire document from the server to the client if the content of the medium size thumbnail does not properly match the original search query.

A medium sized thumbnail of a document can be obtained using existing image compression technologies in order to create a document requiring approximately 10–14 Kbytes as compared with an original document that requires more than ten times the amount of memory. The average size of a web document is between 30–100 Kbytes.

According to the preferred method, a medium sized thumbnail may be downloaded from the server to the client on demand. For instance, when a user moves a pointing device, such as a mouse cursor, over a summary abstract of a desired document listed in a result page, a medium sized thumbnail may be generated and displayed. The medium sized thumbnail is preferably only created for potential documents that appear to match a query. Generation of the medium sized thumbnail (also called medium sized visual abstract) is preferably done on the server side. The server preferably uses a caching mechanism to store the medium sized visual abstracts in a cache database so that users who later access the same document need not regenerate the medium sized abstract. The database may be programmed to store the medium sized visual abstract for a specific amount of time and then delete the abstract to conserve space. The client side of the system includes software that monitors the user's behavior, handles these events (such as downloading the medium sized thumbnail) and performs the associated actions (i.e., displaying the medium sized thumbnail).

Figure 1:
FIG. 1 shows a result page following a typical online search.

FIG. 1 shows a typical result page 5 based on an online search. The result page 5 may contain hyperlinks 10 to external resources that matched the original query. The result page 5 generally includes a short summary description 12 and a visual abstract (i.e., thumbnail) image 14 for each document found in the search. The visual abstract image 14 is not necessary but is done merely for convenience.

The user skims the written abstracts 12 and visual abstract images 14 to determine the best match. In this example, the user believes that document number 3 is the best potential match for his query. However, from reading through the written abstract 12 and viewing the visual abstract image 14, the user is not really sure whether document number 3 is really a good match. Rather than clicking on the third hyperlink 10 to download the entire document from the server to the client, which can take a considerable amount of time, the user may move the mouse pointer (or other pointing device or cursor) over the visual abstract image 14.

Figure 2:
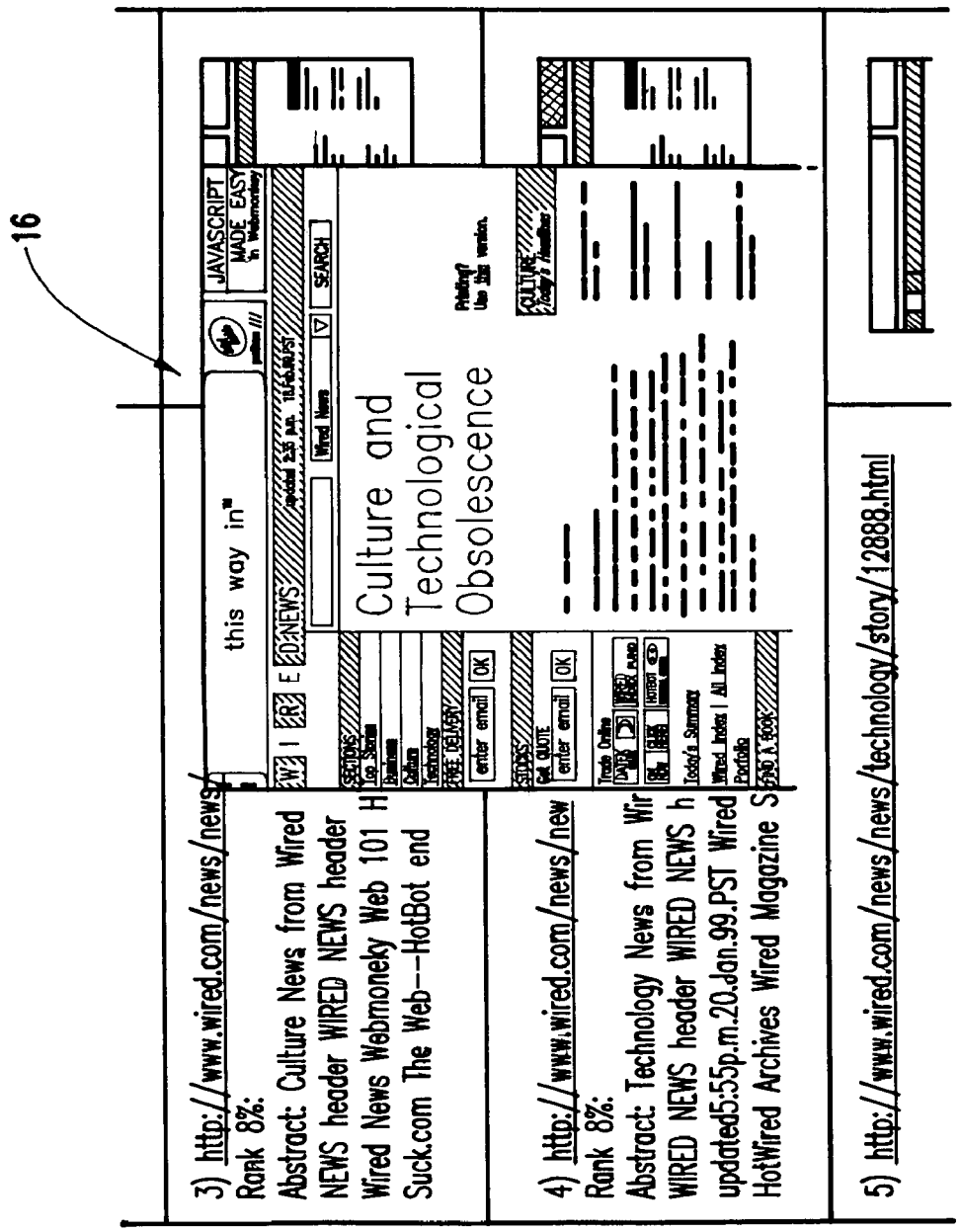
FIG. 2 shows a medium-sized thumbnail of a selected document.

When the mouse pointer (or cursor) is moved over one of the visual abstract images 14, a medium sized visual abstract (i.e., thumbnail) 16 is requested from the server and will ultimately be displayed on the client side as shown in FIG. 2. The user will better recognize the headline, logos, images and title on the medium sized thumbnail 16 as compared with the smaller visual abstract image 14. Using this additional information, the user can better determine whether the document is worth downloading, or the user may decide to continue to skim the remaining summaries to find a better document.

Figure 3:
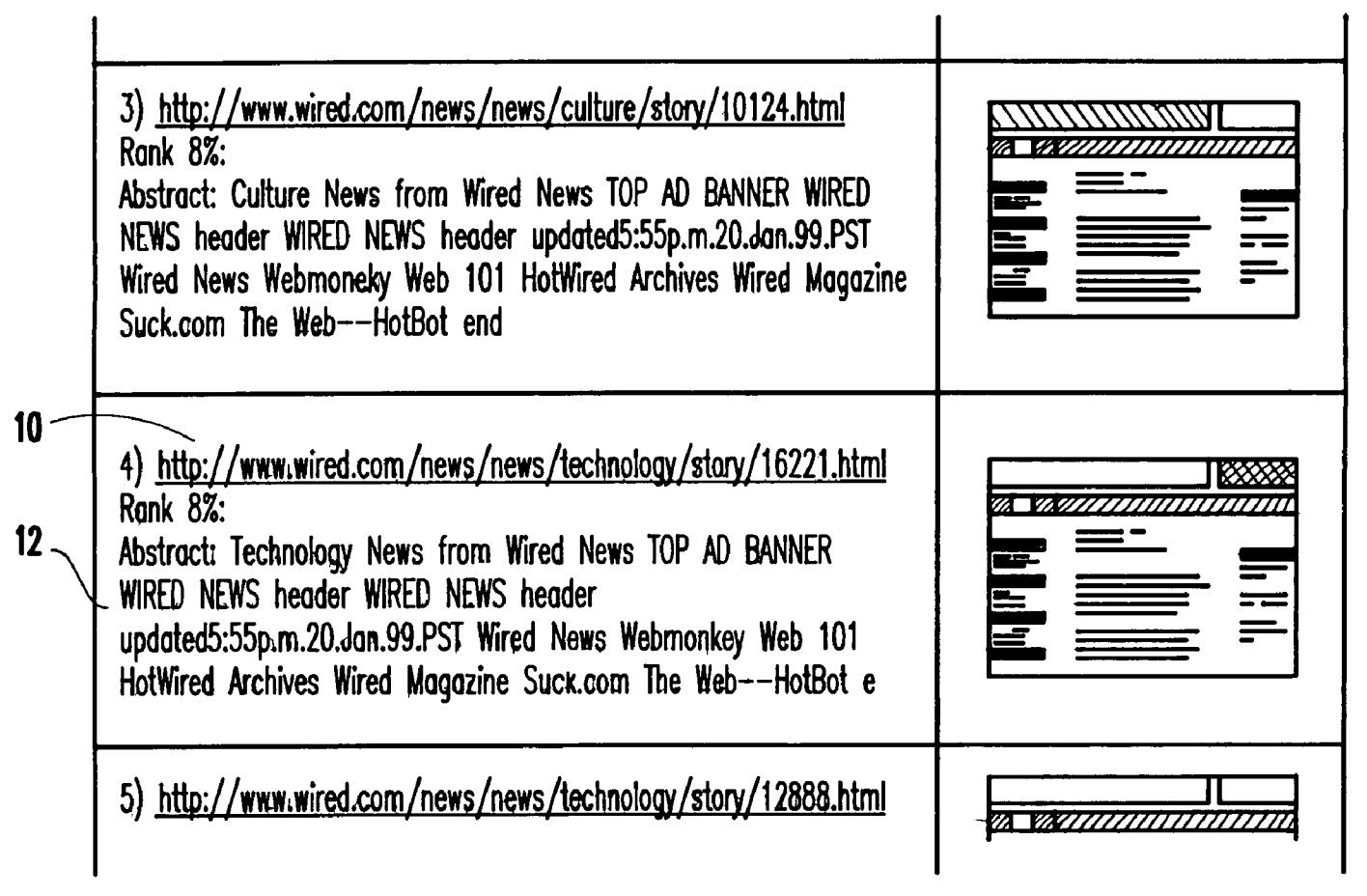

After a user has reviewed the medium sized visual abstract 16, he/she may move the mouse pointer to another location on the result page. The system is preferably programmed such that when the mouse pointer leaves the region of the smaller visual abstract image 14, then the medium sized thumbnail 16 disappears from the screen. FIG. 3 shows the result page 5 after the medium sized thumbnail 16 has been removed from the screen. In order to speed up future processing, the medium sized thumbnail 16 is cached in a database on the client side. Therefore, if the user decides to take a second look at the medium sized thumbnail 16 of the third document, then the image will be directly loaded from the cache database rather than having to regenerate the medium sized thumbnail 16.

Figure 4:
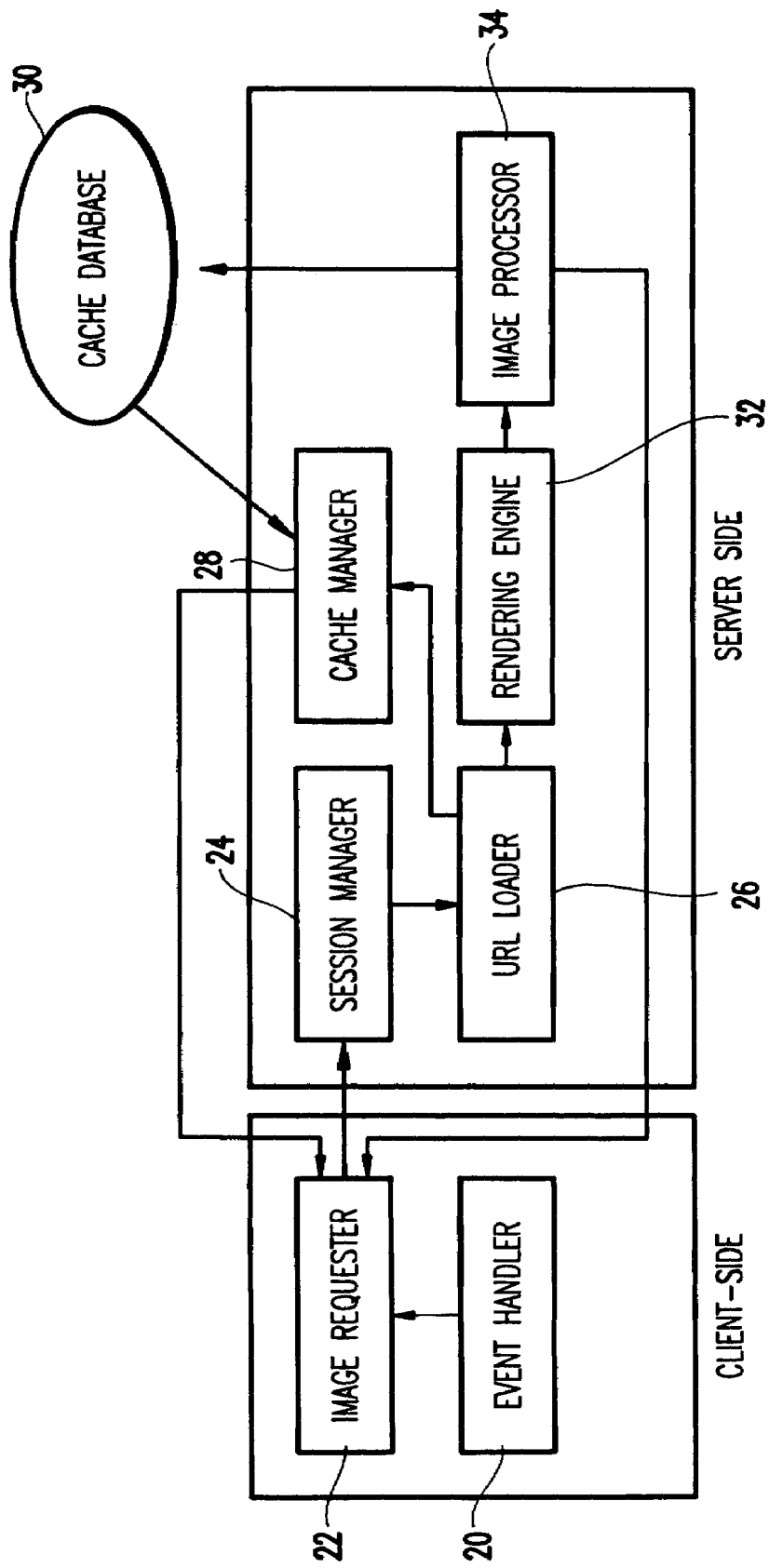
FIG. 4 shows the distributed client and server system according to the present invention.

The system is preferably implemented as a distributed client-server application as described below with respect to FIG. 4. This disclosed system is not limiting as other systems that perform the above disclosed method are also within the scope of the present invention. As one skilled in the art would understand, the system preferably comprises software components.

On the client-side of the system, the event handler 20 tracks actions of the user. Typically users use pointing devices, such as a mouse, to scroll and move through displayed results. These movements are evaluated by the event handler 20. If a user moves the mouse pointer over a specific spot on a result item, or preferably over a (small) visual abstract 14, the event handler 20 triggers an event to the image requester 22 that contains the result item number/id (e.g., document number) and the URL of the requested document. The event handler 20 may also be responsible for hiding or discarding the medium sized visual abstract 16 on the client side once it is no longer needed.

The image requester 22 requests the medium sized thumbnail 16 of a document from the server. The request may be served either from a local cache on the client side via a HTTP request to the server side. The image requester 22 obtains the medium sized thumbnail 16 and passes it to the web browser for display on a display screen. If an error occurs (e.g. a medium sized thumbnail 16 cannot be loaded or generated), then the user will not be able to view the medium sized thumbnail 16.

The above-described client-side components and their basic functionalities are already integrated into most modern web browser technologies. These web browsers provide an application programming interface (API) for scripting languages to achieve the functionalities discussed above.

The server-side components interact closely together to achieve the desired result. The session manager 24 identifies user sessions and retrieves corresponding user settings. For example, the user may turn the medium sized visual abstract feature off. This is desirable if a user uses a text-based web browser (e.g. Lynx) where he/she is not able to view images. The session manager 24 forwards the request to the URL loader 26.

The URL loader 26 looks to the local cache (i.e., cache database 30) by asking the cache manager 28 whether a medium sized thumbnail 16 for the requested document is already stored in the cache database 30. This saves time and increases the overall performance of the system. The system may also include additional component(s) that detect idle cycles of the system and then uses these to generate the medium sized thumbnail 16 in advance.

When a medium sized thumbnail 16 cannot be retrieved from the cache database 30, the URL loader 26 downloads the requested document from the repository (such as the Internet or database) and passes the contents to the rendering engine 32.

The rendering engine 32 renders the document after receiving the document from the URL loader 26. After a successful rendering of the document, the result is passed to the image processor 34.

The image processor 34 captures the rendered document and resizes the image so that it will have a "medium" size in accordance with the present invention. A "medium" size preferably has a width between approximately 250 to 400 pixel units, and a height of approximately 170 to 300 pixel units. JPEG compression results in an image size of between 10 Kbyte to 18 Kbyte on the average. After the image is created, the image processor 34 stores the image in the cache manager 28. The image is passed to the image requester 22 on the client side so that the medium sized thumbnail 16 can be displayed.

As discussed above, the medium sized thumbnails 16 are very useful to enable users to skim faster through a large result set. A medium sized thumbnail 16 is preferably created for only one document at any time so as to save time and network bandwidth.

Another feature of the present invention relates to enhancing the visual abstract (i.e., the thumbnail image) by enlarging the title, headings and logo of a document in the thumbnail image. It is helpful to the user to be able to read the title and headings of the text as the body of the text is generally not readable until the document is fully downloaded.

Figure 5:
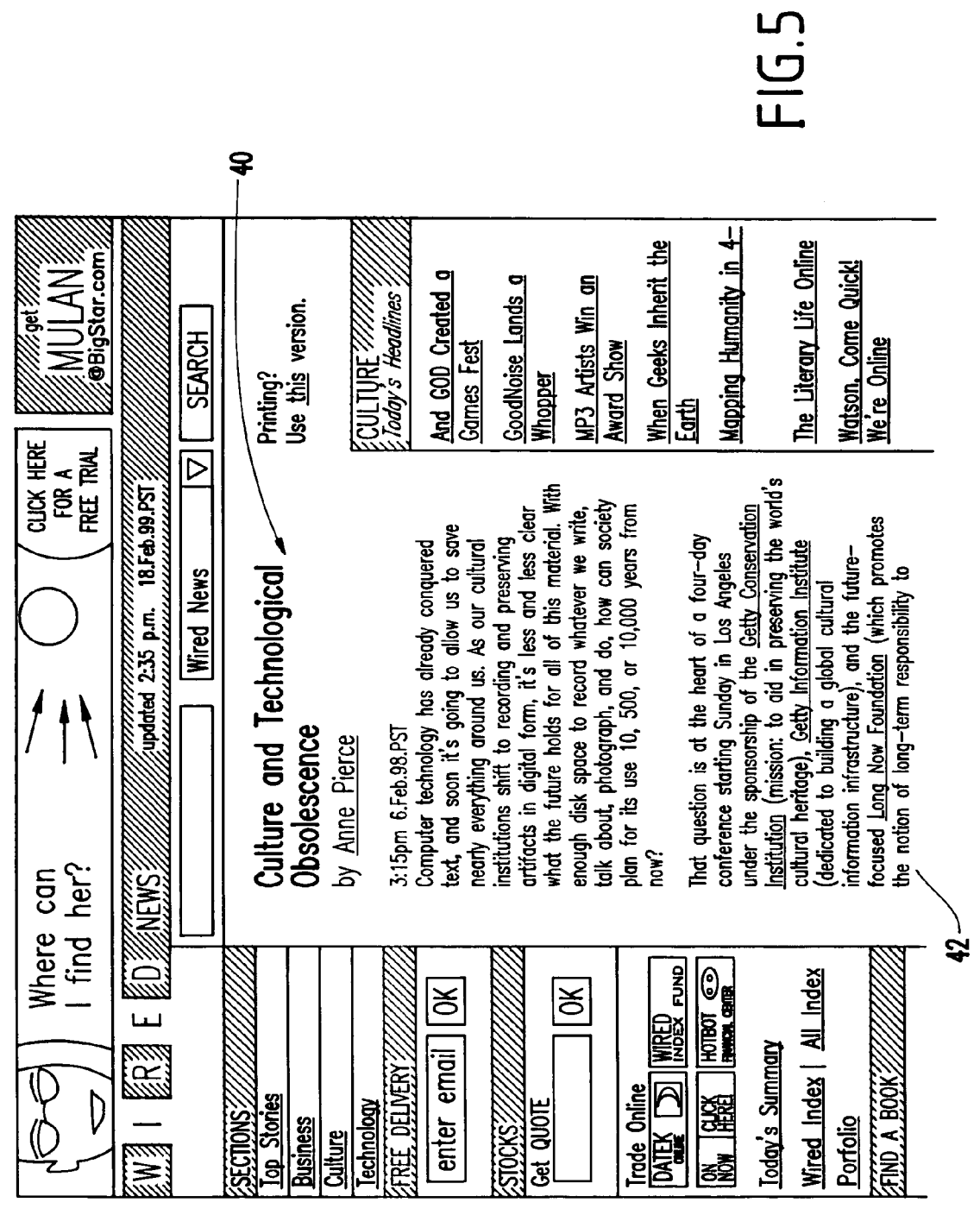

To illustrate the problem, FIG. 5 shows a typical web page document containing a title (or heading) and a body of text 42 in small text. When generating the visual abstract, the present invention may detect portions of the document that are more important (e.g. heading, title) and extract them into an intermediary temporary document. The temporary document may then be passed to a rendering engine and then resized. The result is a small thumbnail in which the user is able to read the heading and/or the title.

Figure 6:
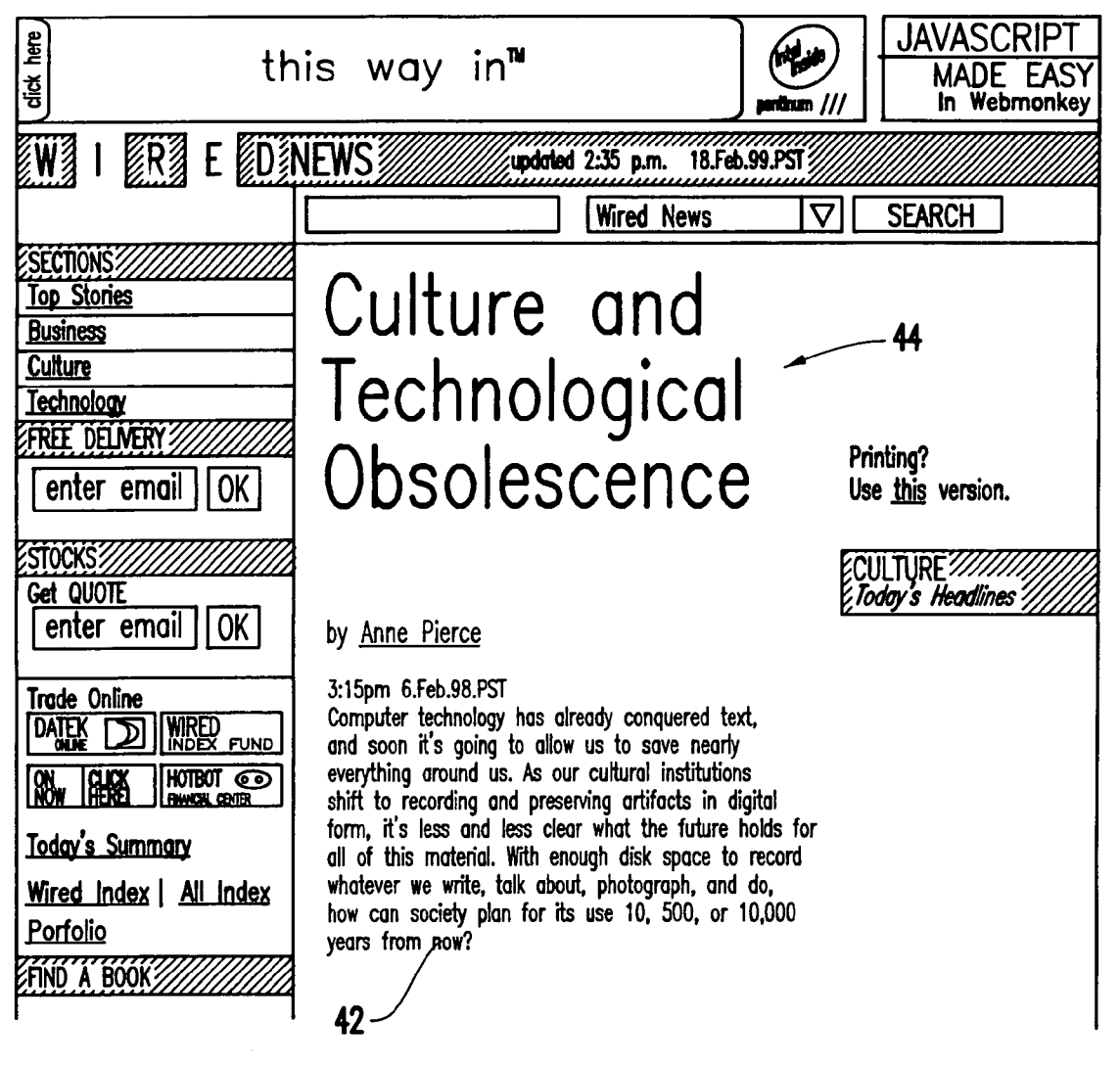

For the example shown in FIG. 5, the system preferably extracts the heading "Culture and Technological Obsolescence". The detection is done by parsing the original document to create a new temporary document that enhances important information. Parsing of the document is preferably done using a standard HTML parser. The parsing process looks for headlines that are marked in HTML using tags such as the <TITLE> tag. These structure tags typically contain relevant information about the topic of a document. FIG. 6 shows an example of the temporary document in which the title/heading has been enhanced to create an enhanced title/heading 44. In the temporary document, the body of text 42 preferably has not been resized.

Figure 7:
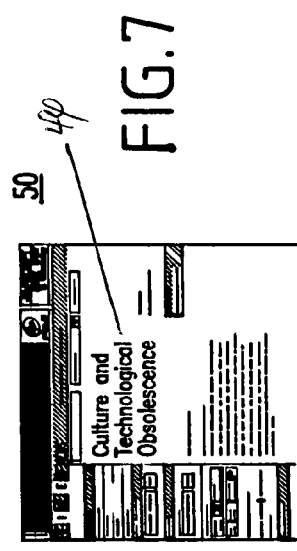
FIG. 7 shows a web page having an enhanced title and proportioned resizing.

After the rendering, standard proportional resizing can be applied to the temporary document to create the visual abstract as shown in FIG. 7, which includes a small visual abstract 50 with enhanced title/headings 44.

The enhanced title/heading 44 allows the user to more easily read the heading. However, the body text may still not be readable. The present invention may enhance the visual abstract so that the user will be able to determine whether it is worth taking a closer look at this document. This has several advantages. First, users will be able to identify headings and/or a title of a small visual thumbnail. Second, the invention will save downloading time and network bandwidth because after looking at this small thumbnail, the user may skip downloading the original document. Third, the invention greatly improves the overall value of a search results page because images are easier to skim than text documents.

Another feature of the present invention is to dynamically present a visual abstract of a result item (document) of a search result set. This takes advantage of the ability to recognize images faster then written text. Thus, a result page will present a list of images containing a visual abstract of the original document along with links/pointers to the resource, title and text abstract as additional/optional items.

The visual abstracts may be dynamically created "on the fly" as opposed to a static approach, which has a disadvantage that it cannot quickly reflect changes of a web document. By using a static approach, the visual abstract is not synchronized within a short period of time. The user may then review an incorrect visual abstract representation of the document. Moreover, the present invention preferably generates visual abstracts only if requested. The system generally will not generate abstracts for documents that have not been requested.

Because rendering and capturing of a larger result set can take a considerable amount of time, the system provides a caching mechanism to enhance the overall performance.

This system according to the present invention preferably works together with a text based search engine. The user submits a query to the search engine. The system analyzes the search results and generates a visual abstract of the original document. Then, the rendered document is converted to an image format (JPEG, TIFF) and the image is resized to a smaller size (i.e., a thumbnail size). The rendering and image converting process is a time consuming task, which can be done off-line for performance reasons. As a result, the modified result page of the search engine contains visual abstracts (thumbnails) of the documents rather then text based summaries.

Figure 8:
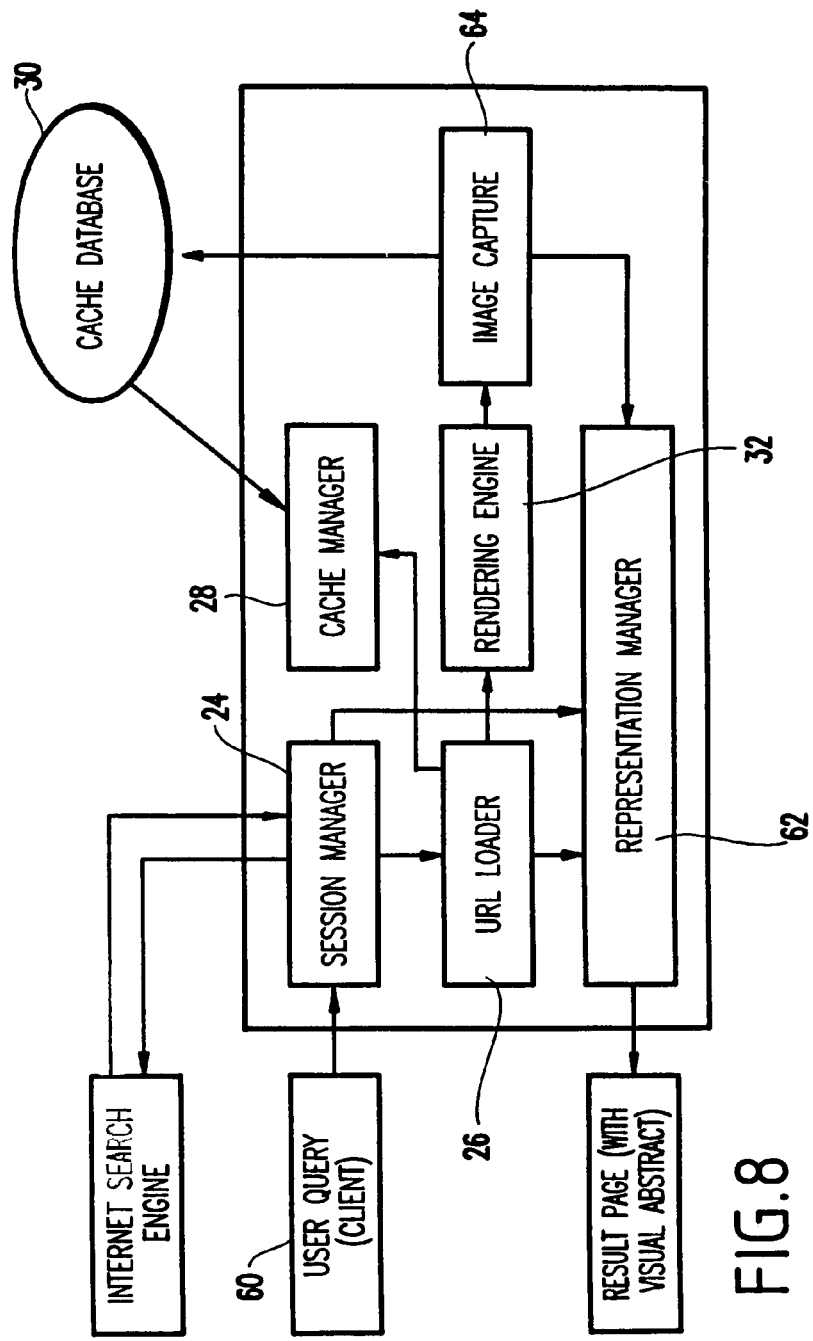
FIG. 8 shows another client and server system according to the present invention.

The system will now be described that performs all the tasks of generating a visual abstract during a user query process on the fly. For performance reasons, the complete process can be enhanced using existing caching technologies, which is handled by the cache manager 28 as shown in FIG. 8.

When a user issues a query 60, the session manager 24 receives the request. The session manager 24 tracks user sessions using existing web technologies (e.g. Cookies, Active Server Pages) as well as analyzes the user settings to determine display preferences. Users may enable or disable the visual abstracts. If the visual abstracts are disabled, the system passes the user query to the search engine system, waits for the returned results and forwards the returned results to the representation manager 62.

If the visual abstracts are enabled, it passes the user query to the search engine system, waits for the returned results and forwards the returned results along with session information to the URL loader 26.

The URL loader 26 takes a list of URLs as an input and then loads the document associated with an URL. When a document is loaded, it forwards the document along with the session id to the rendering engine 32. If a document cannot be loaded, an error message may be passed directly to the representation manager 62 so that the representation manager 62 can skip this entry.

For performance reasons, the URL loader 26 asks the cache manager 28 whether the desired URL was previously loaded. In this case it can directly retrieve the rendered and captured image from the cache manager 28 and pass the visual abstract to the representation manager 62. This saves a lot of work and time and therefore speeds up response time.

The rendering engine 32 takes a HTML document as an input and renders the document. This rendering process can be compared with viewing a HTML document within a web browser. The web browser parses the document and generates the visual representation. However, the result of the rendering process may not be immediately presented to the user. It's an intermediary result that will be passed to the image capturer 64. If the rendering process fails, an error message will be passed to the representation manager 62 so that the representation manager 62 can skip this entry.

The image capturer 64 takes a screen capture of the rendered document and generates an image thumbnail by resizing the original image. This image may then be passed to the cache manager 28 along with a time stamp for later reuse. This prevents the system from skipping rendering and image processing for documents that were already rendered. The image thumbnail along with session information and URL is passed to the representation manager 62, which will construct the result page for the user and integrate the visual abstracts to the summary abstract listing.

Finally, the cache manager 28 stores image thumbnails (i.e., visual abstracts) in a cache database 30 and keeps track of the rendered documents along with a time stamp for each resource. Before the time intensive process of rendering and image processing is initiated, the system first queries the cache manager 28 to determine whether the document is already processed. If so, then the cache manager 28 simply returns the visual abstract.

In summary, the system dynamically creates visual abstracts for search results. The system focuses on the dynamical visual abstract (thumbnail) generation for documents obtained as a search result rather then presenting visual thumbnails of static content. Further, the system does not use the visual abstract (thumbnail of a document) for querying but rather uses the visual abstract to help users identify important contents faster by looking at an image thumbnail.

While the overall methodology of the invention described above generally relates to a client-server environment, the invention can be embodied in any number of different types of systems and executed in any number of different ways, as would be known by one ordinarily skilled in the art.

For example, as shown in FIG. 9, a typical hardware configuration 800 of an information handling/computer system incorporates the client side environment. The system preferably has at least one processor or central processing unit (CPU) 811. The CPUs 811 are interconnected via a system bus 812 to a random access memory (RAM) 814, read-only memory (ROM) 816, input/output (I/O) adaptor 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), communication adapter 834 for connecting an information handling system to the Internet, Intranet, a data processing network, etc., and a display adapter 836 (for connecting the bus 812 to a display device 838). Additionally, an external controller 850 can be coupled to the system through the network and communications adapter 834.

Further, while the present invention has been described primarily in terms of software or software/hardware configuration, the same or similar functions could be implemented in a dedicated hardware arrangement.

In addition to the hardware/software environment described above, a different aspect of the invention includes a computer-implemented method for searching for documents. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform a method of searching for documents.

This signal-bearing media may include, for example, a random access memory (RAM) such as, for example, a fast-access storage contained within the computer. Alternatively, the instructions may be contained in another signal-bearing media, such as a magnetic storage diskette 900 shown exemplarily in FIG. 10, directly or indirectly accessible by the computer.

Whether contained in the diskette, the computer, or elsewhere, the instructions may be stored on a variety of machine-readable data storage media, such as DASD storage (e.g. a conventional "hard drive" or a RAID array), magnetic tape, electronic read-only memory (e.g. ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a suitable language.

While the invention has been described with reference to specific embodiments, the description of the specific embodiments is illustrative only and is not to be considered as limiting the scope of the invention. Various other modifications and changes may occur to those skilled in the art without departing from the spirit and scope of the invention.

What is claimed is:

1. A method of processing search results obtained in response to a user query, the method comprising:
   providing document pointers returned by a search engine to identify a source from which documents are available, each said document pointer including a Uniform Resource Locator (URL) displayed as part of a search result by said search engine;
   generating at least two visual abstracts for at least one of said documents, each of said two visual abstracts being a thumbnail image of a different size, said visual abstracts being generated after first manipulating said document so as to enhance a visibility of at least a portion of said document, said manipulating being performed by filtering said document; and
   formatting a stream of data such that when said data is displayed on a display screen regarding said at least one of said documents, a smaller one of said visual abstracts appears adjacent to a corresponding search result.

2. The method of claim 1, wherein said filtering is performed on an image in said document.

3. The method of claim 1, further comprising:
   displaying a larger one of said visual abstracts on said display screen when requested by said user.

4. The method of claim 3, further comprising:
   storing data relating to said larger one of said visual abstracts.

5. The method of claim 3, wherein said larger one of said visual abstracts is displayed on said display screen when a cursor is moved over said smaller one of said visual abstracts.

6. The method of claim 5, further comprising:
   removing said larger one of said visual abstracts from said display screen.

7. The method of claim 6, wherein said larger one of said visual abstracts is removed from said display screen when said cursor is moved away from said smaller one of said visual abstracts.

8. A method of processing search results obtained in response to a user query, the method comprising:
   examining document pointers returned by a search engine to identify a source from which documents are available, each said document pointer including a Uniform Resource Locator (URL);
   obtaining said documents from said source;
   generating a visual abstract for each of said documents, each visual abstract being a thumbnail image, each said thumbnail image comprising a visual similarity of said document as reduced in size, a title of said document ensured to be readable on each said thumbnail image;
   formatting a stream of data such that when said data is displayed on a display screen, each visual abstract appears adjacent to a corresponding search result;
   creating a larger visual abstract of at least one of said documents;
   displaying said larger one of said visual abstracts on said display screen on demand; and
   removing said larger one of said visual abstracts from said display screen.

9. The method of claim 8, further comprising:
   storing data relating to said larger one of said visual abstracts.

10. The method of claim 8, wherein said larger one of said visual abstracts is displayed on said display screen when a cursor is moved over said smaller one of said visual abstracts.

11. The method of claim 8, wherein said larger one of said visual abstracts is removed from said display screen when said cursor is moved away from said smaller one of said visual abstracts.

12. A method of processing search results obtained in response to a user query, the method comprising:
- examining document pointers returned by a search engine to identify sources from which documents are available, each said document pointer including a Uniform Resource Locator (URL);
- obtaining said documents from said sources;
- generating a visual abstract for each of said documents, each visual abstract being a thumbnail image, each said thumbnail image comprising a visual similarity of said document as reduced in size, a title of said document ensured to be readable on each said thumbnail image;
- formatting a stream of data such that when said data is displayed on a display screen, each visual abstract appears adjacent to a corresponding search result;
- determining whether a portion of a source document should be enhanced for visibility relative to another portion; and
- manipulating said source document determined to have a portion to be enhanced so that one portion therein is manipulated to improve a visibility while another portion therein is manipulated to degrade a visibility, wherein said manipulating includes filtering said source document.

13. The method of claim 12, wherein said filtering is performed on an image in said source document.

14. The method of claim 12, wherein said portion of said source document to be enhanced corresponds to at least one of a title and a heading of said source document.

15. The method of claim 14, wherein one of said title and said heading is enlarged as compared with a second portion of said source document.

16. The method of claim 15, wherein said second portion of said source document corresponds to a body of text of said source document.

17. A method of searching for a document, said method comprising:
- supplying a search request;
- providing abstracts of documents on a screen display that correspond to said search request, said abstracts including a written abstract that contains a summary of a contents of said documents and a first visual abstract of each of said documents;
- creating a second visual abstract of one of said documents, each of said first visual abstract and said second visual abstract respectively being a thumbnail image of said document, wherein said second visual abstract is larger than said first visual abstract;
- displaying said second visual abstract when requested by a user, said second visual abstract being displayed on said display screen when said user moves a pointing device over a corresponding one of said first visual abstract; and
- removing said second visual abstract from said display screen when said user moves said pointing device away from said corresponding one of said first visual abstracts.

18. The method of claim 17, wherein said first visual abstract is created after manipulating a source document so as to enhance visibility of at least a first portion of said source document.

19. The method of claim 18, wherein said first portion corresponds to at least one of a title and a heading of said document.

20. The method of claim 17, further comprising:
- storing data relating to said second visual abstract in a cache database.

21. The method of claim 20, further comprising:
- deleting said data relating to said second visual abstract in said cache database after a predetermined amount of time.

22. A program storage device readable by machine, tangibly embodying a program of instructions executable by said machine to perform method steps for processing search results obtained in response to a user query, said method comprising:
- supplying a search request;
- providing abstracts of documents on a screen display that correspond to said search request, said abstracts including a written abstract containing a summary of a contents of said documents and a first visual abstract of said documents;
- creating a second visual abstract of one of said documents, each of said first visual abstract and said second visual abstract respectively being a thumbnail image of said document, wherein said second visual abstract is larger than said first visual abstract;
- displaying said second visual abstract when requested by a user, said second visual abstract being displayed on said display screen when said user moves a pointing device over a corresponding one of said first visual abstracts; and
- removing said second visual abstract from said display screen when said user moves said pointing device away from said corresponding one of said first visual abstracts.

23. A computer system for searching for a document, said system comprising:
- a client system; and
- a server system,
- said client system supplying a search request to said server system, said server system providing abstracts of documents to said client system, said abstracts corresponding to said search request, said client system displaying said abstracts on a screen display, said abstracts including a written abstract of a contents of said documents and a first visual abstract of each of said documents, said server system creating a second visual abstract of one of said documents, each of said first visual abstract and said second visual abstract respectively being a thumbnail image of said document, said second visual abstract being larger than said first visual abstract when displayed on said screen display, said client system displaying said second visual abstract when requested by a user, said second visual abstract being displayed on said screen display when said user moves a pointing device over said first visual abstract, said second visual abstract being removed from said screen display when said user moves said pointing device away from said first visual abstract of said document.

24. The system of claim 23, wherein said first visual abstract is created after manipulating a source document so as to enhance visibility of at least a first portion of said source document.

* * * * *